United States Patent
Polo-Malouvier et al.

(10) Patent No.: US 8,700,560 B2
(45) Date of Patent: Apr. 15, 2014

(54) POPULATING A MULTI-RELATIONAL ENTERPRISE SOCIAL NETWORK WITH DISPARATE SOURCE DATA

(75) Inventors: Ricardo Polo-Malouvier, Levallois-Perret (FR); Bruno Dumant, Verneuil sur Seine (FR)

(73) Assignee: Business Objects S.A., Levallois-Perret (FR)

( * ) Notice: Subject to any disclaimer, the term of this patent is extended or adjusted under 35 U.S.C. 154(b) by 1173 days.

(21) Appl. No.: 12/253,562

(22) Filed: Oct. 17, 2008

(65) Prior Publication Data

US 2010/0114935 A1     May 6, 2010

(51) Int. Cl.
*G06F 17/30*     (2006.01)
(52) U.S. Cl.
USPC .......................................... 707/602; 707/803
(58) Field of Classification Search
USPC ....................................................... 707/706
See application file for complete search history.

(56) References Cited

U.S. PATENT DOCUMENTS

| | | | |
|---|---|---|---|
| 2004/0153459 A1 | 8/2004 | Whitten et al. | |
| 2005/0086250 A1 | 4/2005 | Richardson | |
| 2005/0177387 A1 | 8/2005 | Mojsa | |
| 2007/0255721 A1* | 11/2007 | Chess et al. ..................... | 707/10 |

FOREIGN PATENT DOCUMENTS

EP     1 118 939 A2     7/2001

OTHER PUBLICATIONS

Maksim Tsvetovat et al., "NetIntel: A Database for Manipulation of Rich Social Network Data", Mar. 3, 2005, CMU-ISRI-04-135, 25pgs.
Mani Abrol et al., "Social Networks for Enterprise Webs", Verity, Inc., [Undated], http://www.verity.com, 33pgs.
"European Search Report of the European Patent Office", mailed Nov. 24, 2009, for EP 09013089.9-2221, 2pgs.

* cited by examiner

*Primary Examiner* — Syed Hasan
(74) *Attorney, Agent, or Firm* — Buckley, Maschoff & Talwalkar LLC

(57) ABSTRACT

Some aspects include association of fields of a data source with one or more entity identities, one or more relation identities, and one or more attributes corresponding, respectively, to entity identities, relation identities and facet attributes defined in metadata of an enterprise social network, and reception of data from the data source. Also included is a determination, based on the data and the associated fields of the data source, of one or more source entities, one or more source entity identities associated with each of the one or more source entities, one or more source relations, one or more source relation identities associated with each of the one or more source relations, and one or more source facets associated with one or more source entities or source relations.
For each determined source entity, it is determined if any of the one or more associated source entity identities is identical to an entity identity of the enterprise social network. A new entity is created in the enterprise social network corresponding to the determined source entity if it is determined that none of the one or more associated source entity identities is identical to an entity identity of the enterprise social network, and, if it is determined that one or more associated source entity identities is identical to an entity identity of the enterprise social network, the enterprise social network is updated with one or more source facets associated with the determined source entity.

21 Claims, 13 Drawing Sheets

Entities_diff 800

| src_id | esn_id | flag |
|---|---|---|
| 2 | | C |
| ... | ... | ... |

FIG. 8

Entities_diff 900

| src_id | esn_id | flag |
|---|---|---|
| 2 | | C |
| 1 | 1234-5 | U |
| ... | ... | ... |

FIG. 9

Entities_diff 1000

| src_id | esn_id | flag |
|---|---|---|
| 2 | 1234-2 | C |
| 1 | | U |
| | 1234-3 | D |
| ... | ... | ... |

Relation_identity1_src (1110)

| src_id | attr9, attr10 |
|---|---|
| 1 | ..., ... |
| 3 | ..., ... |
| 4 | ..., ... |
| ... | ... |

Relation_identity2_src (1120)

| src_id | relation_source | relation_target |
|---|---|---|
| 1 | 1234-1 | 1234-3 |
| 2 | @(2) | 1234-3 |
| ... | ... | ... |

Entities_diff (1130)

| src_id | relation_source | flag |
|---|---|---|
| 1 | 1234-1 | U |
| 2 | | C |
| 3 | 1234-3 | U |
| ... | ... | ... |

Relation_facet1_src (1140)

| src_id | attr11, attr12 |
|---|---|
| 1 | ..., ... |
| 2 | ..., ... |
| 4 | ..., ... |
| ... | ... |

Relations_diff 1300

| src_id | esn_id | flag |
|---|---|---|
| 2 | ... | C |
| ... | ... | ... |

FIG. 13

Relations_diff 1400

| src_id | esn_id | flag |
|---|---|---|
| 2 | | C |
| 1 | 435-1 | U |
| ... | ... | ... |

FIG. 14

Relations_diff 1500

| src_id | esn_id | flag |
|---|---|---|
| 2 | | C |
| 1 | 435-1 | U |
| | 435-3 | D |
| ... | ... | ... |

FIG. 15

POPULATING A MULTI-RELATIONAL ENTERPRISE SOCIAL NETWORK WITH DISPARATE SOURCE DATA

BACKGROUND

Modern organizations receive and store vast quantities of electronic information. Much of this information is associated in some manner with one or more people. For example, home address information may be received from a human resources system, tax-related information may be stored by an accounting system, and project-related information may be stored by a resource planning system.

Conventional systems do not provide efficient mechanisms to identify people or relations between people based on information received from different sources as described above. This deficiency is partly based on the difficulty in matching data associated with a person in one system with data associated with the same person in another system. Even if such data from disparate sources could be matched efficiently, efficient systems for storing and managing the data are lacking. Moreover, conventional techniques cannot efficiently determine, store, or manage multiple types of person-to-person relationships that may be reflected in data received from different sources.

Systems are desired for efficiently receiving and storing data representing entities and relations between the entities. Suitable systems may also store portions of the data in a source-specific manner.

BRIEF DESCRIPTION OF THE DRAWINGS

FIG. 8 is a tabular representation of a load table according to some embodiments.

FIG. 9 is a tabular representation of a load table according to some embodiments.

FIG. 10 is a tabular representation of a load table according to some embodiments FIG. 11 comprises tabular representations of a source data set according to some embodiments.

FIG. 13 is a tabular representation of a load table according to some embodiments.

FIG. 14 is a tabular representation of a load table according to some embodiments.

FIG. 15 is a tabular representation of a load table according to some embodiments.

DETAILED DESCRIPTION

The following description is provided to enable any person in the art to make and use the described embodiments and sets forth the best mode contemplated for doing so. Various modifications will remain readily apparent to those in the art.

Figure 1:
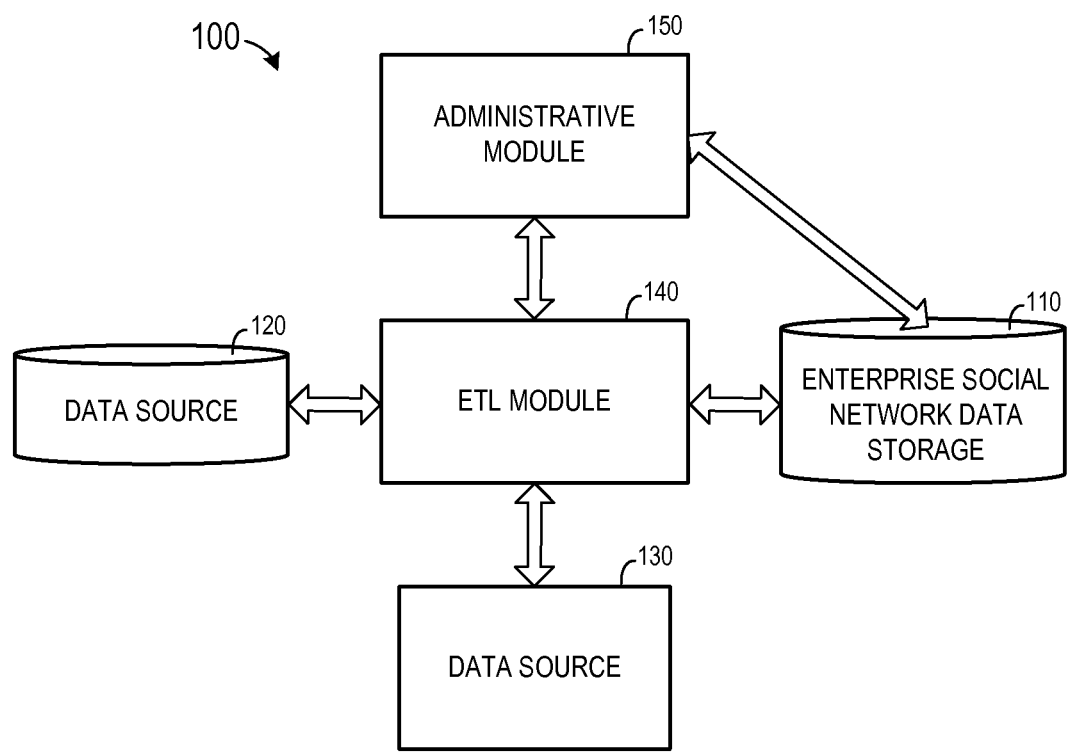
FIG. 1 is a block diagram of a system according to some embodiments.

FIG. 1 is a block diagram illustrating architecture 100 according to some embodiments. Architecture 100 includes enterprise social network (hereinafter "ESN") data storage 110 which may comprise any type or number of data storage systems. ESN data storage 110 stores data related to entities, including but not limited to people. Also stored are data specifying multiple types of relations between the entities. ESN data storage 110 may store data according to a relational schema implementing a data model, embodiments of which are described below. The data model implementation utilized by ESN data storage 110 may be described by metadata stored in ESN data storage 110.

Data sources 120 and 130 may provide data for storage in ESN data storage 110. Embodiments are not limited to two data sources. Data sources 120 and 130 may comprise any suitable data sources that are or become known, including but not limited to enterprise applications (e.g., LDAP/Active Directory, and enterprise applications provided by SAP®, PeopleSoft, SalesForce.com and Exchange through Inxight), any database accessible through a Universe provided by Business Objects®, Web-based social networks (e.g., LinkedIn, Facebook), and project databases.

Data sources 120 and 130 may store and/or provide different fields of data in different formats. For example, data source 120 may provide data fields associated with a management structure, while data source 130 may provide data fields associated with personal characteristics. Data source 120 and data source 130 may provide some data fields representing identical data, but these data fields may be differently-named.

Extract-transform-load (hereinafter "ETL") module 140 may receive data from data sources 120 and 130 and provide the data to ESN data storage 110 in a suitable format for storage. ETL module 140 may comprise an element of a server in communication with data sources 120 and 130 through appropriate connectors.

Administrative module 150 may configure operation of ETL module 140 as described above. Administrative module 150 may comprise a rich client application, an applet in a Web browser, or any other application to perform the processes attributed thereto herein. Generally, the configuration of ETL module 140 may comprise receiving data from data sources 120 and 130 via ETL module 140, receiving metadata from ESN data storage 110, and providing a mapping between fields of the received data and data model elements represented in the metadata.

Figure 2:
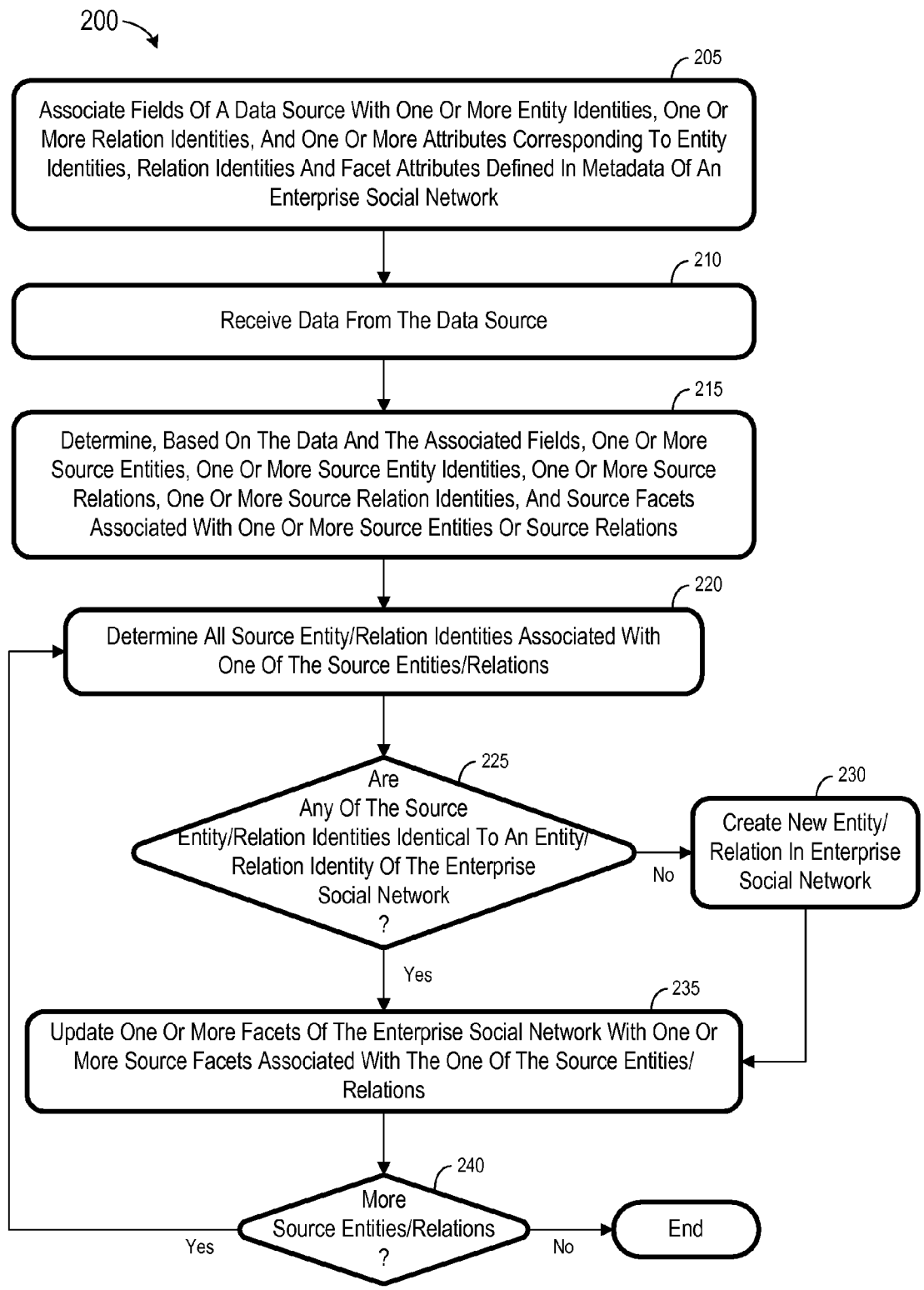
FIG. 2 is a flow diagram of a process according to some embodiments.

FIG. 2 is a flow diagram of process 200 according to some embodiments. Process 200 may be executed by hardware and embodied in program code stored on a tangible computer-readable medium. Process 200 may be performed by ETL module 140 of architecture 100, but embodiments are not limited thereto.

Process 200 may be initiated in order to configure ETL module 140 to receive data from a new data source and provide the data to ESN data storage 110. Initially, at 205, fields of the data source are associated with one or more entity identities, one or more relation identities, and one or more attributes. The entity identities, relation identities, and attributes correspond, respectively, to entity identities, relation identities and facet attributes defined in metadata of an enterprise social network.

According to the present description, an entity represents exactly one "real world" entity. Entities are typed, and an entity type describes a set of entities (e.g., people, organizations). Entities are uniquely identified within ESN data storage 110.

A relation is a link between two distinguished entities (i.e., a source entity and a target entity). Relations are also typed, and a relation type describes a set of relations having the same semantics (e.g., "is the manager of", "has sent an email to"). Each relation identified within ESN data storage 110 represents exactly one "real-world" relation, and each "real-world" relation is represented by exactly one defined relation.

An entity may be associated with entity identities and a relation may be associated with relation identities. An identity (entity or relation) is a set of attribute-value pairs that uniquely designates an entity or a relation in the context of a given identity definition. Each identity definition specifies the set of attributes it uses to identify a given entity or relation.

A facet is a set of attribute-value pairs associated with any entity or relation. A facet includes values provided by only one data source. A facet definition defines the specific set of attributes which make up the attribute-value pairs of a facet.

Figure 3:
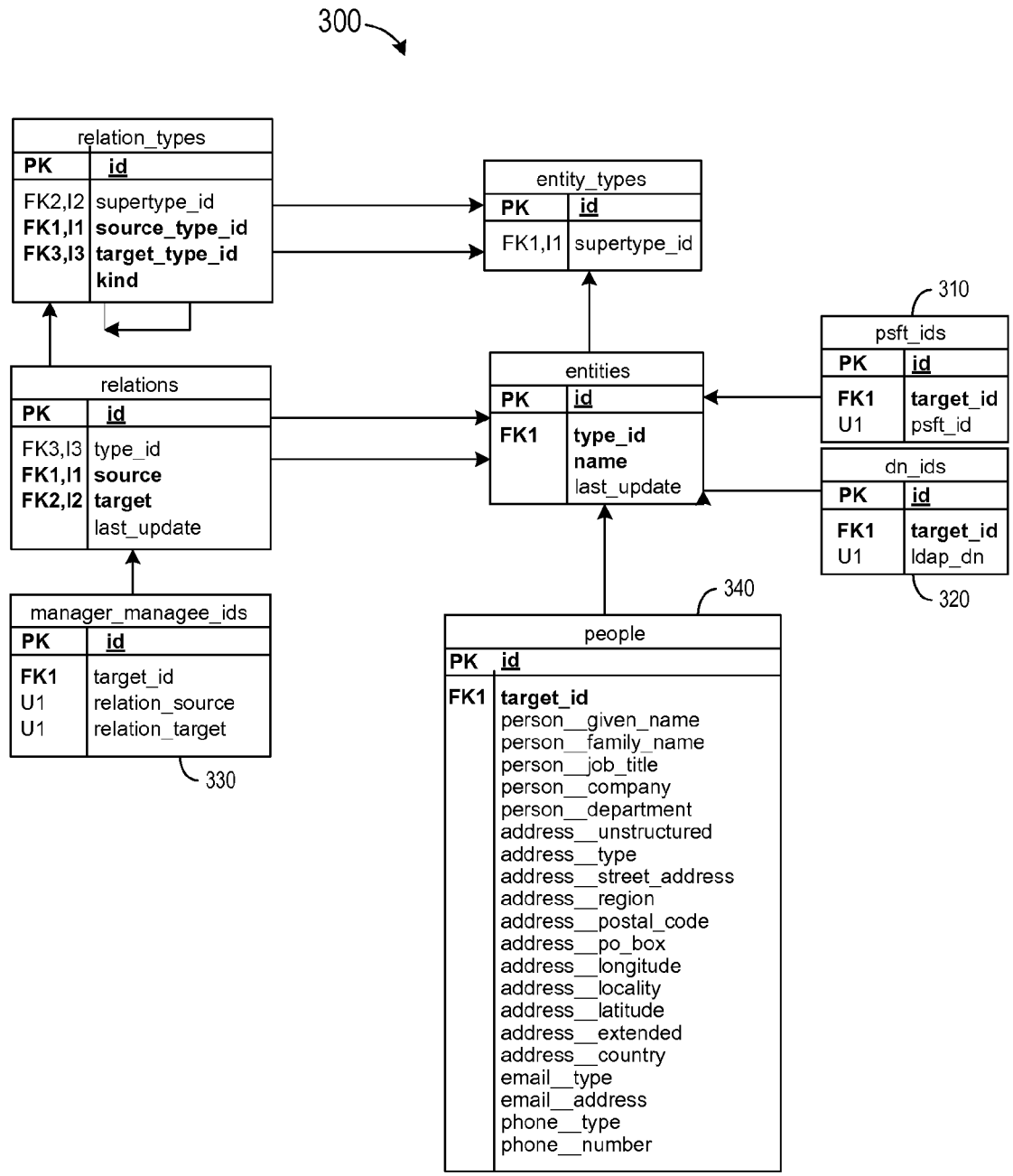
FIG. 3 is a chart of a relational data model according to some embodiments.

FIG. 3 is a chart defining an example of relational schema 300 implementing the above-described data model. Greyed-out tables 310 through 330 are examples of actual identity definitions specifying a set of identifying attributes as described above. Similarly, facet table 340 is an example of a facet definition associated with entities and specifying a specific set of attributes.

Accordingly, tables 310 through 330 may comprise the entity identities, relation identities and facet attributes defined in metadata of an enterprise social network, and which are referenced at 205. 205 may therefore comprise mapping fields of the data source to the attributes of tables 310 through 340. In some embodiments, an administrator operates administrative module 150 to receive sample data from the data source via ETL module 140, to determine the metadata (e.g., tables 310 through 340) from ESN data storage 110, and to map fields of the received sample data to the attributes of tables 310 through 340. The mapping may then be provided to ETL module 140.

Next, data is received from the data source at 210. The data may be pushed from the data source or pulled therefrom through a query mechanism. Based on the data and the field associations (i.e., the mapping) of 205, one or more source entities, one or more source entity identities associated with each of the one or more source entities, one or more source relations, one or more source relation identities associated with each of the one or more source relations, and one or more source facets associated with one or more source entities or source relations are determined at 215.

More particularly, the received data may include many values associated with the fields described above. The values of the fields associated with entity identities are used to determine one or more source entity identities and the values of the fields associated with entity identities are used to determine one or more source relation identities. Each source entity identity is associated with a source entity that is, for now, independent of any entities defined in ESN data storage 110. As shown by tables 310 and 320 of FIG. 3, a single source entity may be associated with two source entity identities.

With regard to facets, the values of the fields associated with facet attributes are used to determine source facets (i.e., sets of attribute-value pairs) associated with one or more of the source entities or source relations.

At 220, all source entity (or relation) identities associated with one of the source entities (or relations) are determined. Next, at 225, it is determined whether any of the source entity (or relation) identities are identical to an entity (or relation) identity of the ESN. ETL module 140 may query ESN data storage 110 for all entity (or relation) identities and, at 225, compare the results against the source entity (or relation) identities determined at 220.

A new entity (or relation) is created in the ESN at 230 if none of the determined source entity (or relation) identities associated with the one source entity (or relation) are identical to an entity (or relation) identity of the ESN. One or more facets of the ESN which are associated with the one source entity (or relation) are then updated with the source facet(s) determined for the source entity (or relation) at 215. In a case that the determination at 225 is affirmative, flow proceeds directly to 235 to update the one or more facets of the ESN as described above. Creation of an entity (or relation) and updating a facet according to some embodiments is described in more detail below.

Next, at 240, it is determined whether more source entities (or relations) determined at 215 remain to be processed. If so, flow returns to 220 and continues as described above for a next source entity (or relation). Flow therefore cycles between 220 and 240 until no more source entities (or relations) remain to be processed.

Figure 4:
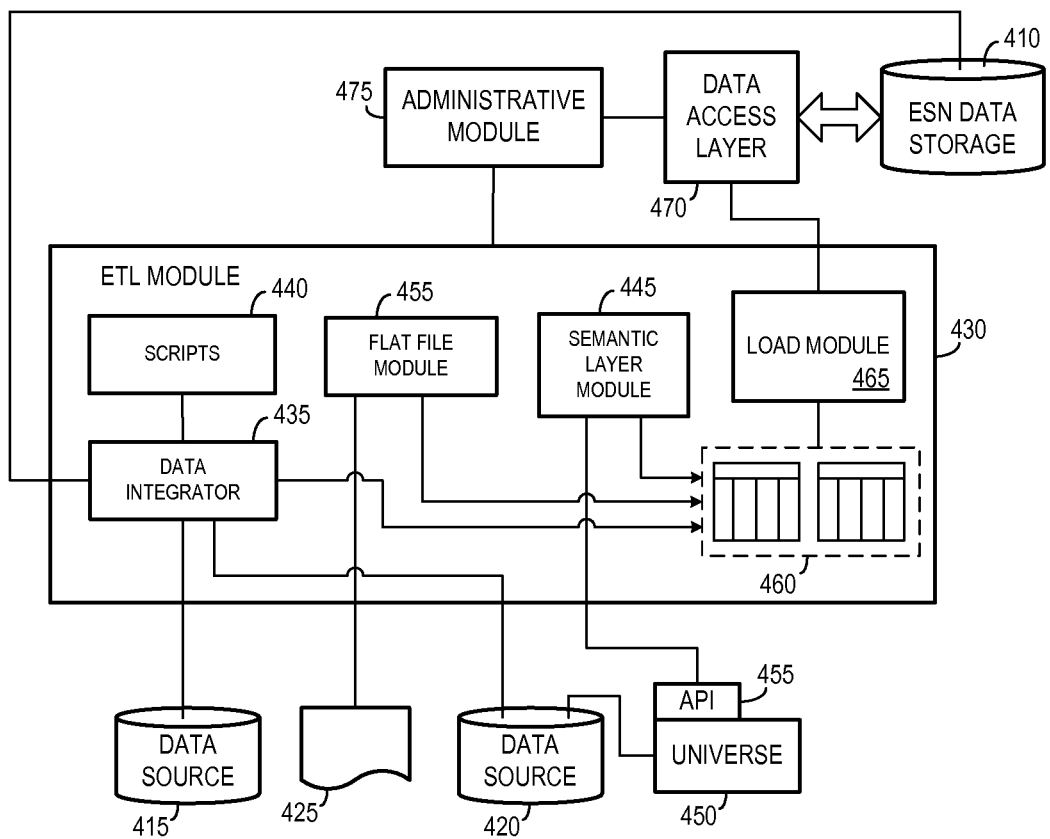
FIG. 4 is a block diagram of a system according to some embodiments.

FIG. 4 is a block diagram of architecture 400 according to some embodiments. Architecture 400 may comprise an implementation of architecture 100 and/or process 200, but embodiments are not limited thereto.

Architecture 400 includes ESN data storage 410, which may be implemented as described above. Also shown are data sources 415 and 420, which may comprise any suitable databases or applications, including but not limited to those mentioned above. Flat file 425 is another type of data source that may provide delimited data to ETL module 430.

ETL module 430 includes data integrator 435 for acquiring data from certain data sources such as data source 415 and data source 420. Scripts 440 may dictate both acquisition of the data and transformation of the data according to process 200 or below-described process 500. Data integrator 435 may also provide appropriate connectors for directly accessing ESN data storage 410.

Semantic layer module 445 may access data of data source 420 via universe 450. Application programming interface (API) 455 may expose an interface providing such access. The semantic abstractions provided by universe 450 may conform to the data model implemented in ESN data storage 410. Accordingly, semantic layer module 445 may receive the data of data source 420 in the form of source entity identities, source relation identities and source facets consistent with the metadata of ESN data storage 410. Flat file module 455 may receive data from flat file 425 and transform the data to source entity identities, source relation identities and source facets as described herein.

Each of data integrator 435, semantic layer module 445 and flat file module 455 may generate source tables 460. Source tables 460 may include source entity identities, source relation identities and source facets determined based on data received from a data source. Load module 465 uses source tables 460 to create entities and relations in ESN data storage 410, to delete entities and relations from ESN data storage 410, and to update facets of ESN data storage 410 as will be described below.

Load module 465 accesses ESN data storage 410 through data access layer 470. Data access layer 470 may provide security functions (i.e., authentication, etc.) to manage access to ESN data storage 410, and may provide encapsulation of the data. Data access layer 470 may implement an API that is callable by load module 465 or by administrative module 475 to read, update or delete data or metadata stored in ESN data storage 410.

Administrative module 475 may be implemented in any suitable manner. Administrative module 475 may receive data and metadata from ESN data storage 410, and allow an administrator to associate fields of the received data with data model elements represented in the metadata.

Figure 5A:
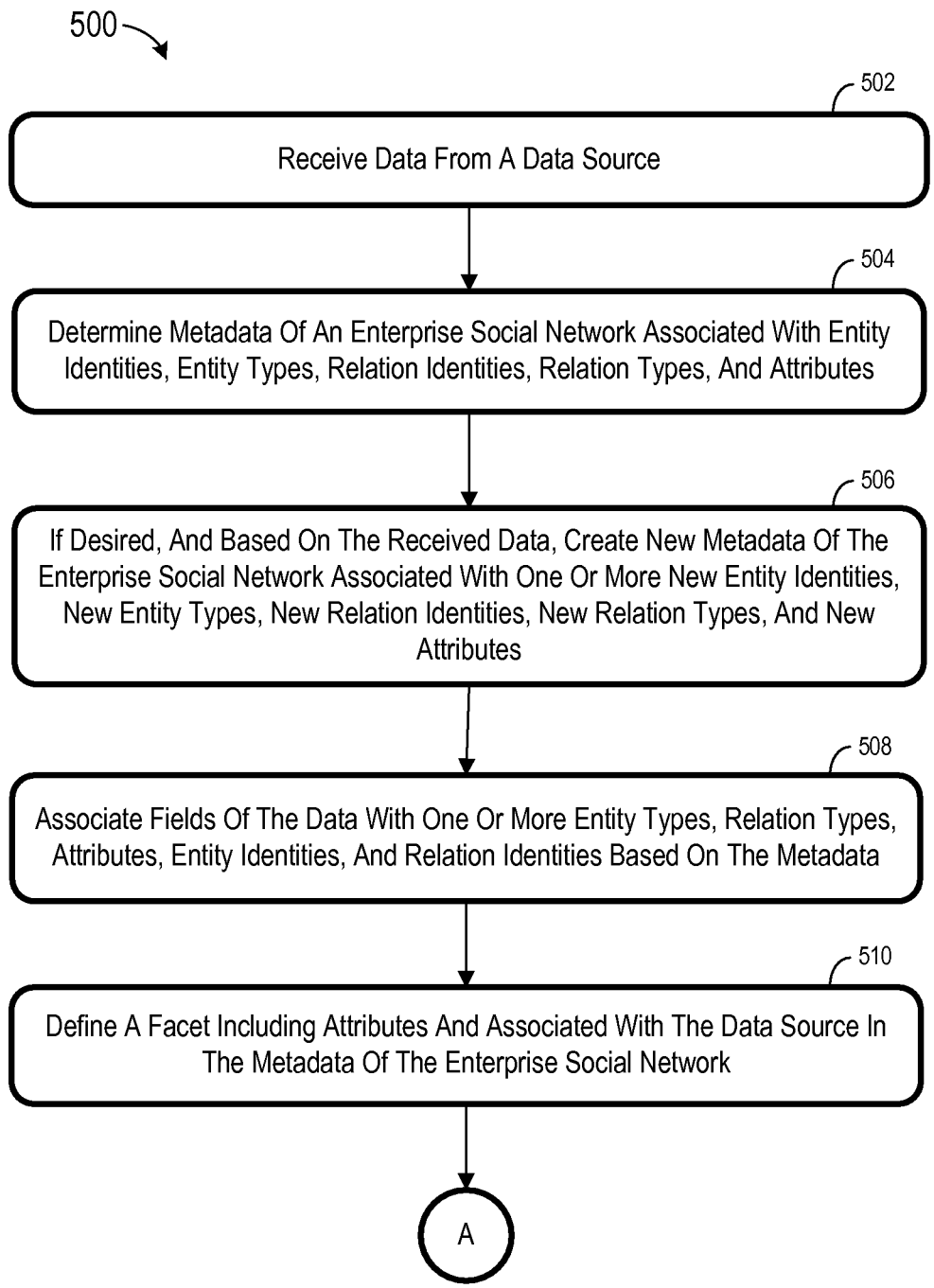
FIGS. 5A through 5C comprise a flow diagram of a process according to some embodiments.
Figure 5B:
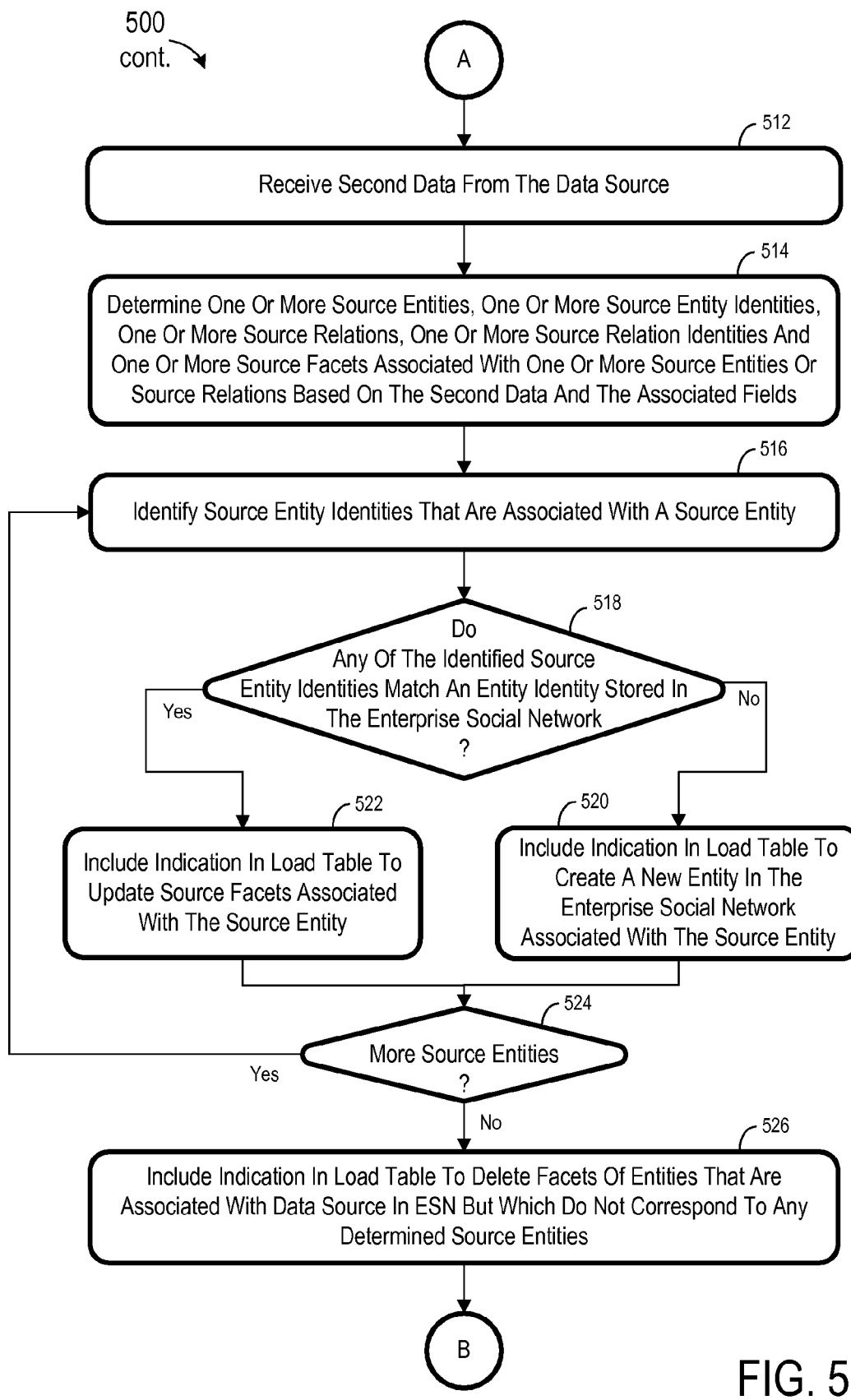
Figure 5C:
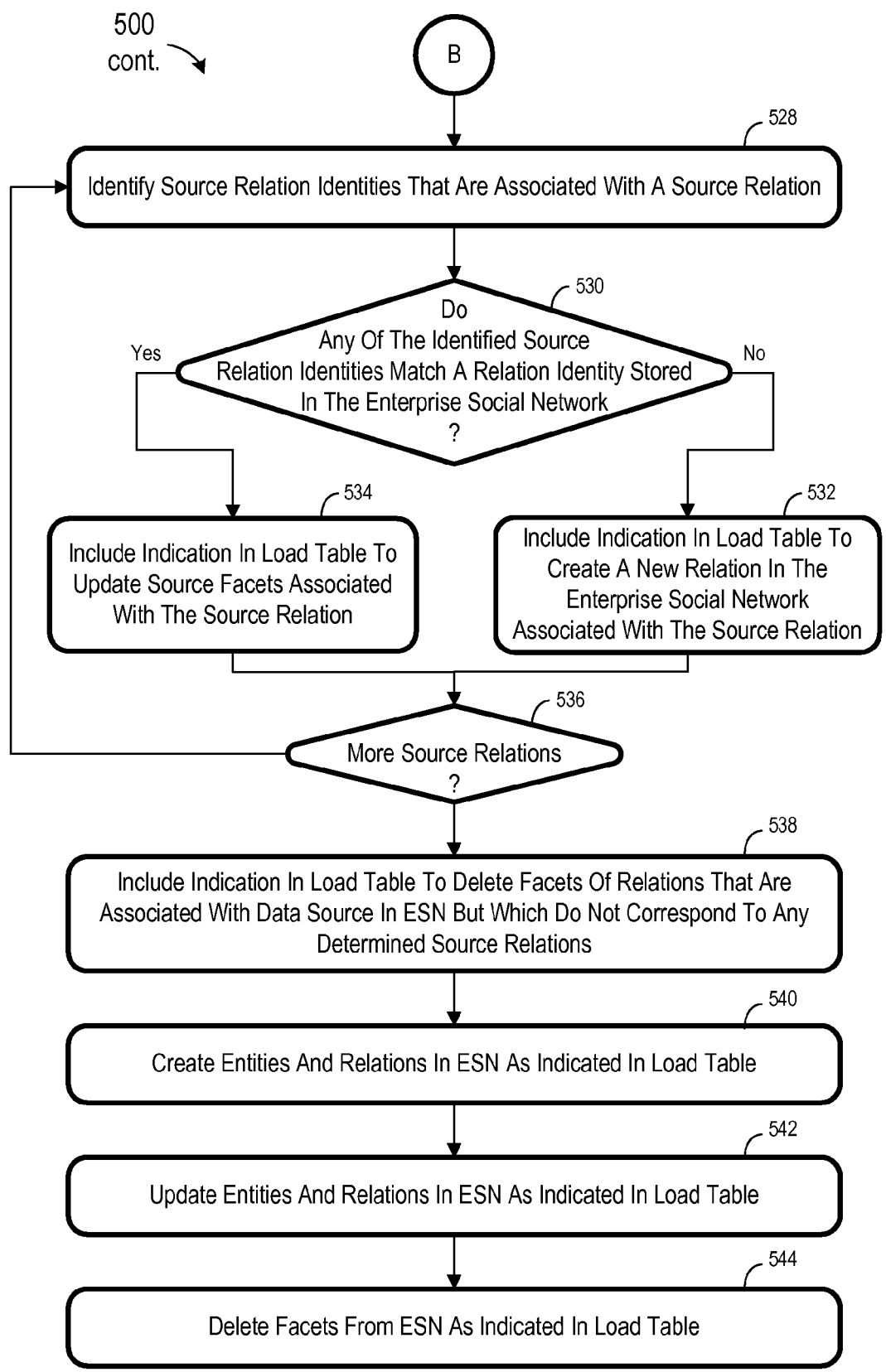

FIGS. 5A through 5C comprise a flow diagram of process 500 according to some embodiments. Process 500 may be executed by hardware and embodied in program code stored on a tangible computer-readable medium. Process 500 may be performed by ETL module 140 or ETL module 430 described above, but embodiments are not limited thereto.

Data is received from a data source at 502. In some embodiments, administrative module 475 instructs ETL module 430 to receive data from a selected data source. ETL module 430 uses an appropriate one of data integrator 435, semantic layer module 445 and flat file module 455 to receive the data and pass the data to administrative module 475 at 502.

Next, metadata of an ESN is determined at 504. The metadata is associated with entity identities, entity types, relation identities, relation types, and attributes. Using the API of data access layer 470, administrative module 475 may access the appropriate metadata of ESN data storage 410. The metadata may comprise identity definitions (e.g., tables 310 through 330 of schema 300) and facet definitions (e.g., table 340).

If desired, and based on the data received at 502, new metadata of the ESN may be created at 506. The new metadata may be associated with one or more new entity identities, new entity types, new relation identities, new relation types, and new attributes. Administrative module 475 may provide a user to create new identity definitions, type definitions and attribute definitions if needed to suitably characterize the data received from the data source.

Fields of the data source are associated with one or more entity types, one or more entity identities, one or more relation types, one or more relation identities, and one or more attributes at 508. The types, identities, and attributes correspond, respectively, to types, identities, and attributes defined in metadata of the ESN. 508 may therefore comprise mapping fields of the data source to the attributes of tables 310 through 340.

Because facets are data source-specific, at least one facet associated with the data source is created in the metadata of the ESN at 510. The facet includes attributes already defined by the metadata. The facet may be represented in the metadata by a facet definition such as table 340.

Second data is received from the data source at 512. The second data may be received via the same components of ETL module 430 used to receive the data at 502. In this regard, administrative module 475 provides these components with the field associations of 508 and the facet information of 510 so that suitable source tables 460 may be built from the received data at 514. The source tables include one or more source entities, one or more source entity identities associated with each of the one or more source entities, one or more source relations, one or more source relation identities associated with each of the one or more source relations, and one or more source facets associated with one or more source entities or source relations.

Figure 6:
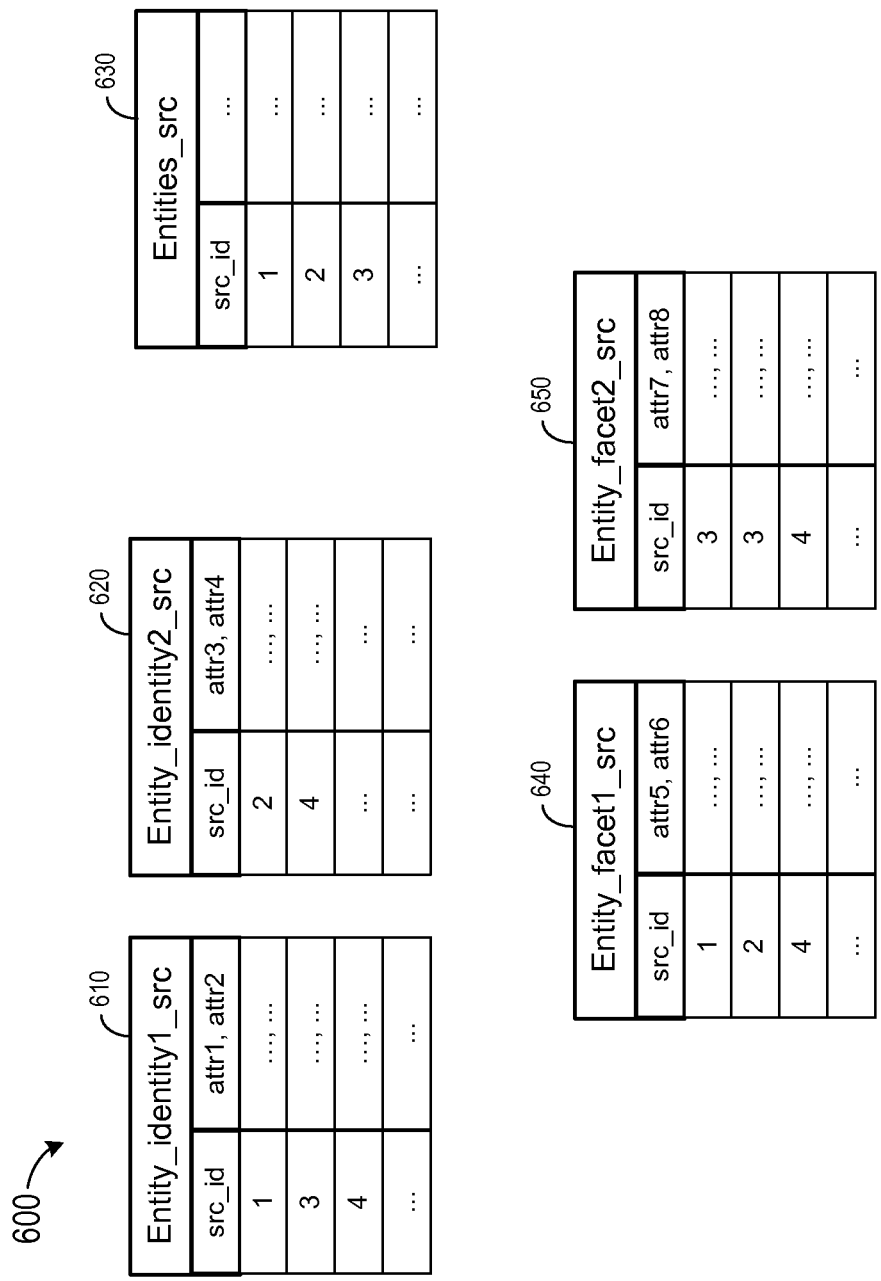
FIG. 6 comprises tabular representations of a source data set according to some embodiments.
Figure 7:
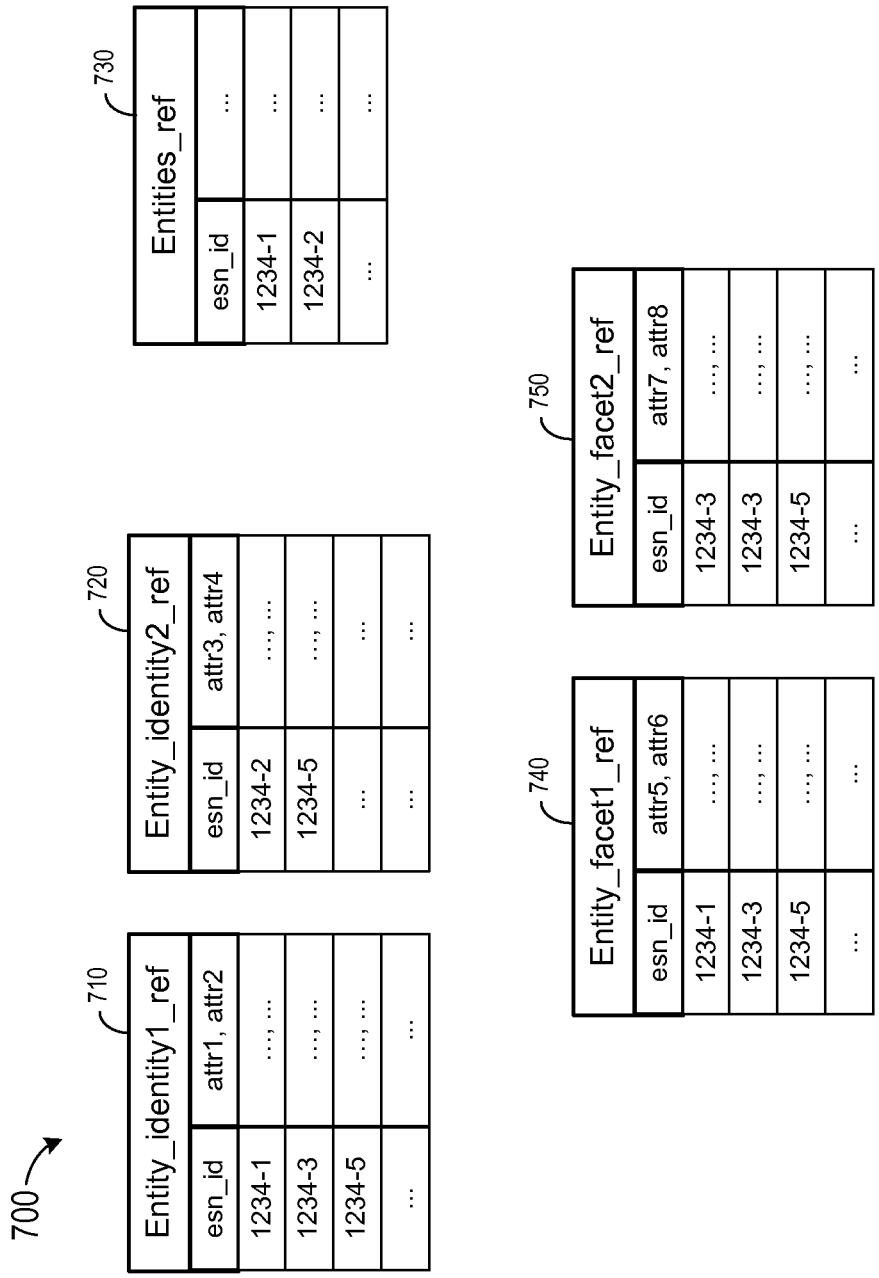
FIG. 7 comprises tabular representations of a reference data set according to some embodiments.
Figure 12:
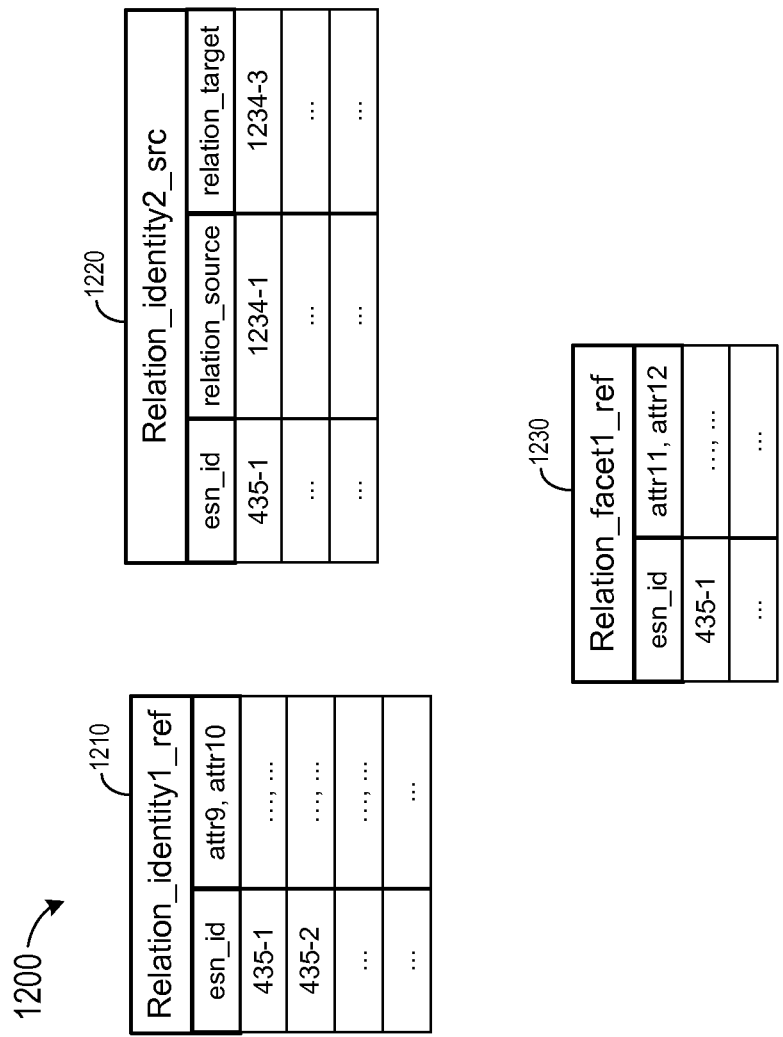
FIG. 12 comprises tabular representations of a reference data set according to some embodiments.

FIG. 6 is a view of source entity tables 600 according to some embodiments. For the sake of continuity, source relation tables determined at 514 will be described below beginning with element 528 of process 500.

Source entity table 610 specifies source entity identities which are based on a first entity identity definition including attribute1 and attribute2. The values of attribute1 and attribute2 for each source entity identity of table 610 are determined from the received second data based on the field associations created at 508. Each source identity of table 610 is associated with a source-specific entity identifier src_id. The source-specific entity identifier provides a means to relate the data of each of tables 600, and is independent of any entity identifier used in ESN data storage 410.

Source entity identity table 620 specifies source entity identities which are based on a second entity identity definition including attribute3 and attribute4. The values of attribute3 and attribute4 for each source entity identity of table 620 are also determined from the received second data based on the field associations created at 508. As shown, source entity "4" is associated with a first entity identity of table 610 and a second entity identity of table 620.

Tables 630 and 640 relate to different source entity facets. The source facet of table 630 is associated with a facet definition including attribute5 and attribute6 and created in ESN 410 at 510, while the source facet of table 640 is associated with a facet definition of ESN 410 including attribute7 and attribute8. Each row of facet tables 630 and 640 associates a source facet with a source entity. The values of each source facet are determined from the received second data based on the field-to-attribute associations created at 508.

Tables 600 may comprise source tables 460 generated by one of data integrator 435, flat file module 455 or semantic layer module 445 according to some embodiments. Accordingly, the remaining elements of process 500 may be performed by load module 465 of ETL module 430.

Returning to process 500, all source entity identities associated with one of the source entities are determined at 516. With reference to the present example, all source entity identities associated with source entity "2" may be determined at 516. Table 620 holds the sole source entity identity associated with source entity "2".

At 518, it is determined whether any of the source entity identities match an entity identity stored in the ESN. Load module 465 may query ESN data storage 410 at 518 for all stored entity identities associated with the identity definitions of tables 610 and 620.

Tables 700 represent data stored in ESN data storage 410. Each row of table 710 includes values for attribute1 and attribute2, and each row of table 710 includes values for attribute3 and attribute4. Accordingly, values associated with the identified source entity identities in tables 610 and 620 are compared with values in corresponding tables 710 and 730 to identify a match.

Flow proceeds to 520 if none of the determined source entity identities associated with the identified source entity matches an entity identity of the ESN. It will be assumed that the source entity identity associated with source entity "2" in table 620 does not match any corresponding entity identity of the ESN. Therefore, at 520, an indication is created in a load table to create a new entity in the ESN associated with the identified source entity. Table 800 of FIG. 8 is an example of such a load table. Load module 465 may create and maintain load table 800 in memory.

Flow then continues to 524 and to 516 to identify source entity identities that are associated with another source entity. For example, source entity "1" is selected and the sole source entity identity of table 610 is identified at 516. It will be assumed that the source entity identity associated with source entity "1" in table 610 matches the corresponding entity identity associated with esn_id 1234-5 of reference table 710. Accordingly, at 522, an indication is included in a load table to update the ESN with source facets associated with the source entity. Load table 900 of FIG. 9 reflects this indication according to some embodiments.

Flow cycles between 516 and 524 for additional source entities until no more source entities remain to be processed. Next, at 526, an indication is included in the load table to delete facets of entities that are associated with the data source in the ESN but which do not correspond to any of the source entities determined at 514. Continuing with the present example, such an indication is shown in load table 1000 of FIG. 10.

All source relation identities associated with one of the identified source relations are determined at 528. FIG. 11 is a view of source relation tables 1100 according to some embodiments. Source relation tables 1100 may be determined at 514 as described above. Tables 1100 may comprise source tables 460 generated by one of data integrator 435, flat file module 455 or semantic layer module 445 according to some embodiments.

Source relation identity table 1110 specifies source relation identities which are based on a first relation identity definition including attribute9 and attribute 10. The values of attribute9 and attribute10 for each source relation identity of table 1110 are determined from the received second data based on the field associations created at 508. Each source identity of table 1110 is associated with a source-specific relation identifier src_id. The source-specific relation identifier relates the data of each of tables 1100, and is independent of any relation identifier used in ESN data storage 410.

Source relation identity table 1120 specifies source relation identities which are based on a second entity identity definition including attribute "relation_source" and "relation_target". The values of these attributes for each source relation identity of table 1120 are also determined from the received second data based on the field associations created at 508. However, since these values are source entity identifiers, and since a correlation between some source entity identifiers and ESN entity identifiers was already established as shown in Entities_diff table 1130, the source entity identifiers have been replaced with their corresponding ESN entity identifiers. A placeholder "@(2)" is used for those source entity identifiers values whose corresponding ESN entity identifiers are currently not known.

Table 1140 relates to a source relation facet associated with the data source. The source relation facet of table 1140 is associated with a facet definition including attribute11 and attribute12 and created in ESN 410 at 510. Each row of facet table 1140 associates a source facet with a source relation. The values of each source facet are determined from the received second data based on the field-to-attribute associations created at 508.

At 530, it is determined whether any of the source relation identities match a relation identity stored in the ESN. Tables 1200 represent relation data stored in ESN data storage 410. Each row of table 1210 includes values for attribute9 and attribute10, and each row of table 1220 includes values for attribute "relation_source" and attribute "relation_target". Accordingly, values associated with the identified source relation identities in tables 1210 and 1220 are compared with values in corresponding tables 1210 and 1230 to identify a match at 530.

If none of the determined source relation identities associated with the identified source relation matches a relation identity of the ESN, flow proceeds to 532. Assuming that the source relation identity associated with source relation "2" in table 1120 does not match any corresponding relation identity of the ESN, an indication is included in a load table at 532 to create a new relation in the ESN associated with the identified source relation. Resulting load table 1300 is shown in FIG. 13.

Flow then continues to 536 and to 528 to identify source relation identities that are associated with another source relation. If source relation "1" is selected, then the source relation identity associated with source relation "1" in table 1120 may be determined to match the corresponding relation identity associated with esn_id 435-1 of reference table 1220. Accordingly, at 534, an indication is included in a load table to update the ESN with source facets associated with the source relation. Load table 1400 of FIG. 14 reflects this indication according to some embodiments.

Once no more source entities remain to be processed, an indication is included in the load table at 538 to delete facets of relations that are associated with the data source in the ESN but which do not correspond to any of the source relations determined at 514. An example of this indication is shown in load table 1500 of FIG. 15.

Load module 465 may operate in conjunction with data access layer 470 to perform 540 through 544 of process 500 based on load tables 460. At 540, entities and relations are created in ESN data storage 410 as indicated in the created load tables. Each created entity and relation is associated with a unique esn_id. The entities may be created before creating the relations to which they belong so that the esn_ids of the entities are available to define the relations. Any placeholder values such as "(2)" mentioned above may be replaced by a corresponding newly generated esn_id.

Entities and relations are updated at 542 as indicated in the load tables. Such updating comprises updating facets corresponding to the entities and relations. Next, at 544, facets marked for deletion are deleted, or otherwise rendered obsolete or unusable.

The embodiments described herein are solely for the purpose of illustration. Those in the art will recognize that other embodiments may be practiced with modifications and alterations limited only by the claims.

What is claimed is:

1. A method comprising:
   associating fields of a data source with one or more entity identities, one or more relation identities, and one or more attributes corresponding, respectively, to entity identities, relation identities and facet attributes defined in metadata of an enterprise social network that is separate from the data source;
   receiving data from the data source that is separate from the enterprise social network;
   determining, based on the data received from the data source that is separate from the enterprise social network and on the associated fields of the data source, one or more source entities, one or more source entity identities associated with each of the one or more source entities, one or more source relations, one or more source relation identities associated with each of the one or more source relations, and source facets associated with one or more source entities or source relations; and
   for each source entity that is determined based on the data received from the data source that is separate from the enterprise social network and on the associated fields of the data source:
      determining if any of the one or more associated source entity identities is identical to an entity identity of the enterprise social network;
      creating a new entity in the enterprise social network corresponding to the determined source entity if it is determined that none of the one or more associated source entity identities is identical to an entity identity of the enterprise social network; and updating the enterprise social network with one or more source facets associated with the determined source entity if it is determined that one or more associated source entity identities is identical to an entity identity of the enterprise social network.

2. A method according to claim 1, further comprising:

for each determined source relation:

determining if any of the one or more associated source relation identities is identical to a relation identity of the enterprise social network;

creating a new relation in the enterprise social network corresponding to the determined source relation if it is determined that none of the one or more associated source relation identities is identical to a relation identity of the enterprise social network; and updating the enterprise social network with one or more source facets associated with the determined source relation if it is determined that one or more associated source relation identities is identical to a relation identity of the enterprise social network.

3. A method according to claim 2, wherein creating the new relation in the enterprise social network corresponding to the determined source relation comprises:

including an indication in a load table to create the new relation in the enterprise social network corresponding to the determined source relation, and wherein updating the enterprise social network with the one or more source facets associated with the determined source relation comprises:

including an indication in the load table to update one or more source facets associated with the determined source relation.

4. A method according to claim 3, wherein creating the new relation in the enterprise social network corresponding to the determined source relation further comprises:

updating the enterprise social network with the one or more source facets associated with the determined source relation.

5. A method according to claim 1, wherein associating fields of the data source comprises:

determining original metadata of the enterprise social network defining entity identities, relation identities, and facet attributes; and creating new metadata of the enterprise social network associated with new entity identities, new relation identities, and new facet attributes, wherein the metadata comprises the original metadata and the new metadata.

6. A method according to claim 5, further comprising:

defining a facet in the metadata of the enterprise social network, the facet associated with the data source and including the one or more of the facet attributes.

7. A method according to claim 1, wherein creating the new entity in the enterprise social network corresponding to the determined source entity comprises:

including an indication in a load table to create the new entity in the enterprise social network corresponding to the determined source entity, and wherein updating the enterprise social network with the source facet attributes associated with the determined source entity comprises:

including an indication in the load table to update one or more source facets associated with the determined source entity.

8. A method according to claim 7, wherein creating the new entity in the enterprise social network corresponding to the determined source entity further comprises:

updating the enterprise social network with the one or more source facets associated with the determined source entity.

9. A method according to claim 1, further comprising:

deleting from the enterprise social network a facet associated with the data source and with an entity which does not correspond to any of the determined source entities.

10. A method according to claim 9, further comprising:

deleting from the enterprise social network a facet associated with the data source and with a relation which does not correspond to any of the determined source relations.

11. A non-transitory computer-readable medium having stored thereon program code, the program code executable by a computer to:

associate fields of a data source with one or more entity identities, one or more relation identities, and one or more attributes corresponding, respectively, to entity identities, relation identities and facet attributes defined in metadata of an enterprise social network that is separate from the data source;

receive data from the data source that is separate from the enterprise social network;

determine, based on the data received from the data source that is separate from the enterprise social network and on the associated fields of the data source, one or more source entities, one or more source entity identities associated with each of the one or more source entities, one or more source relations, one or more source relation identities associated with each of the one or more source relations, and one or more source facets associated with one or more source entities or source relations; and for each source entity that is determined based on the data received from the data source that is separate from the enterprise social network and on the associated fields of the data source:

determine if any of the one or more associated source entity identities is identical to an entity identity of the enterprise social network;

create a new entity in the enterprise social network corresponding to the determined source entity if it is determined that none of the one or more associated source entity identities is identical to an entity identity of the enterprise social network; and update the enterprise social network with one or more source facets associated with the determined source entity if it is determined that one or more associated source entity identities is identical to an entity identity of the enterprise social network.

12. A medium according to claim 11, the program code further executable to:

for each determined source relation:

determine if any of the one or more associated source relation identities is identical to a relation identity of the enterprise social network;

create a new relation in the enterprise social network corresponding to the determined source relation if it is determined that none of the one or more associated source relation identities is identical to a relation identity of the enterprise social network; and update the enterprise social network with one or more source facets associated with the determined source relation if it is determined that one or more associated source relation identities is identical to a relation identity of the enterprise social network.

11

13. A medium according to claim 12, wherein the program code executable to create the new relation in the enterprise social network corresponding to the determined source relation further comprises program code executable to:
  update the enterprise social network with the one or more source facets associated with the determined source relation.

14. A medium according to claim 11, wherein the program code further executable to:
  define a facet in the metadata of the enterprise social network, the facet associated with the data source and including the one or more of the facet attributes.

15. A medium according to claim 11, wherein the program code executable to create the new entity in the enterprise social network corresponding to the determined source entity comprises program code executable to:
  update the enterprise social network with the one or more source facets associated with the determined source entity.

16. A system comprising:
  an enterprise social network database storing metadata defining entity identities, relation identities and facet attributes;
  a data source that is separate from the enterprise social network and to provide data comprising data fields; and
  an administration module to associate the data fields with one or more entity identities, one or more relation identities, and one or more attributes corresponding, respectively, to the entity identities, relation identities and facet attributes defined in the metadata; and
  an extract-transform-load module to:
    receive data from the data source that is separate from the enterprise social network;
    determine, based on the data received from the data source that is separate from the enterprise social network and on the associated fields of the data source, one or more source entities, one or more source entity identities associated with each of the one or more source entities, one or more source relations, one or more source relation identities associated with each of the one or more source relations, and one or more source facets associated with one or more source entities or source relations; and
    for each source entity that is determined based on the data received from the data source that is separate from the enterprise social network and on the associated fields of the data source:
      determine if any of the one or more associated source entity identities is identical to an entity identity of the enterprise social network;
      create a new entity in the enterprise social network corresponding to the determined source entity if it is determined that none of the one or more associated source entity identities is identical to an entity identity of the enterprise social network; and
      update the enterprise social network with one or more source facets associated with the determined source entity if it is determined that one or more associated source entity identities is identical to an entity identity of the enterprise social network.

17. A system according to claim 16, the extract-transform-load module further to:

12 for each determined source relation:
    determine if any of the one or more associated source relation identities is identical to a relation identity of the enterprise social network;
    create a new relation in the enterprise social network corresponding to the determined source relation if it is determined that none of the one or more associated source relation identities is identical to a relation identity of the enterprise social network; and
    update the enterprise social network with one or more source facets associated with the determined source relation if it is determined that one or more associated source relation identities is identical to a relation identity of the enterprise social network.

18. A system according to claim 17, wherein creation of the new relation in the enterprise social network corresponding to the determined source relation comprises:
  update of the enterprise social network with the one or more source facets associated with the determined source relation.

19. A system according to claim 16, the extract-transform-load module further to:
  define a facet in the metadata of the enterprise social network, the facet associated with the data source and including the one or more of the facet attributes.

20. A system according to claim 16, wherein creation of the new entity in the enterprise social network corresponding to the determined source entity comprises:
  update of the enterprise social network with the one or more source facets associated with the determined source entity.

21. A method according to claim 1, wherein the associating fields of a data source with one or more entity identities, one or more relation identities, and one or more attributes corresponding, respectively, to entity identities, relation identities and facet attributes defined in metadata of an enterprise social network comprises:
  creating a mapping by associating the fields of the data source with the one or more entity identities, the one or more relation identities, and the one or more attributes corresponding, respectively, to entity identities, relation identities and facet attributes defined in metadata of an enterprise social network; and
  wherein the determining, based on the data and the associated fields of the data source, one or more source entities, one or more source entity identities associated with each of the one or more source entities, one or more source relations, one or more source relation identities associated with each of the one or more source relations, and source facets associated with one or more source entities or source relations comprises:
  determining the one or more source entities, the one or more source entity identities, the one or more source relations, the one or more source relation identities and the source facets based on the data and the mapping that is created by associating fields of the data source with the one or more entity identities, the one or more relation identities, and the one or more attributes corresponding, respectively, to entity identities, relation identities and facet attributes defined in metadata of the enterprise social network.

* * * * *